United States Patent
Lindh

(10) Patent No.: US 7,212,583 B2
(45) Date of Patent: May 1, 2007

(54) TRANSMISSION OF SIGNAL

(75) Inventor: Lars E. Lindh, Helsinki (FI)

(73) Assignee: Nokia Corporation, Espoo (FI)

( * ) Notice: Subject to any disclaimer, the term of this patent is extended or adjusted under 35 U.S.C. 154(b) by 698 days.

(21) Appl. No.: 10/305,406

(22) Filed: Nov. 27, 2002

(65) Prior Publication Data

US 2004/0101062 A1    May 27, 2004

(51) Int. Cl.
H04K 1/02      (2006.01)
H04L 5/12      (2006.01)
H04L 23/02     (2006.01)

(52) U.S. Cl. ........................... 375/296; 375/261

(58) Field of Classification Search ............ 455/114.3, 455/126, 108, 572, 307, 522; 375/296, 285, 375/254, 229, 294, 261, 297, 349, 146, 147, 375/316; 330/106–107, 149
See application file for complete search history.

(56) References Cited

U.S. PATENT DOCUMENTS

| | | | |
|---|---|---|---|
| 6,175,551 B1 | 1/2001 | Awater et al. | |
| 6,504,862 B1* | 1/2003 | Yang | 375/146 |
| 6,597,746 B1* | 7/2003 | Amrany et al. | 375/296 |
| 6,931,079 B1* | 8/2005 | Peeters | 375/296 |
| 6,963,621 B1* | 11/2005 | Beech et al. | 375/296 |
| 2003/0058959 A1* | 3/2003 | Rafie et al. | 375/296 |
| 2003/0223505 A1* | 12/2003 | Verbin et al. | 375/261 |

FOREIGN PATENT DOCUMENTS

EP      1 168 748      1/2002

OTHER PUBLICATIONS

Armstrong, Jean, "New OFDM Peak-to-Average Power Reduction Scheme," XP-001067062, May 6, 2001, IEEE VTC 2001, pp. 756-760.

Armstrong, J., "Peak-to-average power reduction for OFDM by repeated clipping and frequency domain filtering," Feb. 28, 2002, Electronics Letter, vol. 36, No. 5.

Chen, Hangium et al., "Iterative Estimation and Cancellation of Clipping Noise for OFDM Signals," XP-001175968, Jul. 2003, IEEE Communications Letters, vol. 7, No. 7, pp. 305-307.

Ochiai, Hideki, "Power Efficiency Comparison of OFDM and Single-Carrier Signals," Sep. 24, 2002, IEEE, pp. 899-903.

* cited by examiner

*Primary Examiner*—Mohammed Ghayour
*Assistant Examiner*—Sophia Vlahos
(74) *Attorney, Agent, or Firm*—Squire, Sanders & Dempsey L.L.P.

(57) ABSTRACT

The invention relates to a radio transmitter using QAM modulation, comprising a first transmit filter for filtering data symbols to be transmitted to form a waveform, means for comparing the waveform to a predetermined threshold value, means for clipping power peaks that exceed the predetermined threshold value from the waveform to form a clipped waveform, means for multiplying the clipped power peaks with an impulse response of a receive filter to form an impaired signal, means for subtracting the impaired signal from the data symbols to be transmitted to form subtracted data symbols, a second transmit filter for filtering the reduced data symbols to form a modulated signal, and means for up-converting the modulated signal to a transmission frequency.

8 Claims, 4 Drawing Sheets

TRANSMISSION OF SIGNAL

BACKGROUND OF THE INVENTION

1. Field of the Invention

The invention relates to a method and a transmitter in a telecommunication network. Specifically, the invention aims to reduce PAPR (Peak-to-Average Power Ratio) in QAM modulated signal transmission.

2. Description of the Related Art

In radio systems, a data-carrying base-band signal is modulated with the carrier wave. In PSK (Phase Shift Keying) modulation, the phase of the carrier waveform is changed depending on the symbol value in the information signal. In QAM (Quadrature Amplitude Modulation), both the phase and the amplitude are changed depending on the symbol values.

QAM is an excellent modulation method from the point of view of efficiency but suffers from high PAPR. A high PAPR will need a power amplifier with a high 1-dB compression point in order to transmit the waveform undistorted even if the average power of the signal is much lower. This will lead to an expensive solution. If the signal is clipped by the amplifier, unacceptable spectral leakage to the adjacent channels will occur.

SUMMARY OF THE INVENTION

It is the object of this invention to provide a solution which reduces the PAPR in conjunction with QAM modulation without causing spectral leakage. The invention relates to a data transmission method used in conjunction with QAM modulation in a radio system, the method comprising steps of filtering data symbols to be transmitted with a first transmit filter to form a waveform, comparing the waveform to a predetermined threshold value of power level, clipping power peaks that exceed the predetermined threshold value from the waveform to form a clipped waveform, filtering the clipped waveform with a receive filter to form an impaired signal, filtering the impaired signal with a second transmit filter to form a modulated signal, and up-converting the modulated signal to a transmission frequency.

The invention also relates to a data transmission method used in conjunction with QAM modulation in a radio system, the method comprising steps of filtering data symbols to be transmitted with a first transmit filter to form a waveform, comparing the waveform to a predetermined threshold value of power level, clipping power peaks that exceed the predetermined threshold value from the waveform, multiplying the clipped power peaks with an impulse response of a receive filter to form an impaired signal, subtracting the impaired signal from the data symbols to be transmitted to form subtracted data symbols, filtering the subtracted data symbols with a second transmit filter to form a modulated signal, and up-converting the modulated signal to a transmission frequency.

The invention also relates to a radio transmitter using QAM modulation, comprising a first transmit filter for filtering data symbols to be transmitted to form a waveform, means for comparing the waveform to a predetermined threshold value, means for clipping power peaks that exceed the predetermined threshold value from the waveform to form a clipped waveform, a receive filter for filtering the clipped waveform to form an impaired signal, a second transmit filter for filtering the impaired signal to form a modulated signal, and means for up-converting the modulated signal to a transmission frequency.

The invention also relates to a radio transmitter using QAM modulation, comprising a first transmit filter for filtering data symbols to be transmitted to form a waveform, means for comparing the waveform to a predetermined threshold value, means for clipping power peaks that exceed the predetermined threshold value from the waveform to form a clipped waveform, means for multiplying the clipped power peaks with an impulse response of a receive filter to form an impaired signal, means for subtracting the impaired signal from the data symbols to be transmitted to form subtracted data symbols, a second transmit filter for filtering the subtracted data symbols to form a modulated signal, and means for up-converting the modulated signal to a transmission frequency.

Embodiments of the invention are described in the dependent claims.

The object of the invention is achieved by injecting a small impairment into the symbols to be transmitted. This impairment is selected so that the PAPR is reduced. The amount of PAPR reduction can be controlled in the invention by controlling the threshold value determining the degree of clipping. The threshold value corresponds to the desired PAPR of the output signal and can be set according to the amplifier capabilities. Besides this impairment, there are no side effects like spectrum regrowth in the adjacent channels in a solution according to the invention.

Generally, in transmission, the data symbols are up-sampled well above the Nyquist rate, that is, at a rate at least twice the signal bandwidth before the signal is fed to the transmit filter. The transmit filter produces the initial waveform, which is then clipped in order to cut the highest power peaks in the signal. In the invention, before providing the signal to the final transmit filter, impairment is injected into the clipped signal by exposing the signal to two extra filtering stages, that is, one transmit filter and one receive filter, which in principle are contrary to each other. The first filtering stage is performed before clipping and the second filtering stage after the clipping phase. By these additional filtering phases, a small impairment is injected into the data-carrying signal, thereby reducing power peaks in the signal. The impairment is due to the fact that the error introduced by the clipping is spread out among a few neighbour symbols.

In one embodiment, the two filtering stages can be realized by using a transmit filter and a receive filter, which together form a raised cosine filter. In another embodiment, instead of the receive filter, an impulse response of a receive filter is used, thereby reducing the need for filters from three to two in the transmission chain.

The method and system of the invention provide several advantages. For instance, the invention reduces PAPR significantly with minimal degradation since there is no spectral leaking to adjacent channels. Due to the reduced PAPR, smaller and more cost-effective amplifiers can be used. The solution is particularly attractive in uplink, since the size of the power amplifier is a very important factor in the terminal.

BRIEF DESCRIPTION OF THE DRAWINGS

In the following, the invention will be described in greater detail with reference to the preferred embodiments and the accompanying drawings, in which.

DESCRIPTION OF THE PREFERRED EMBODIMENTS

Figure 1:
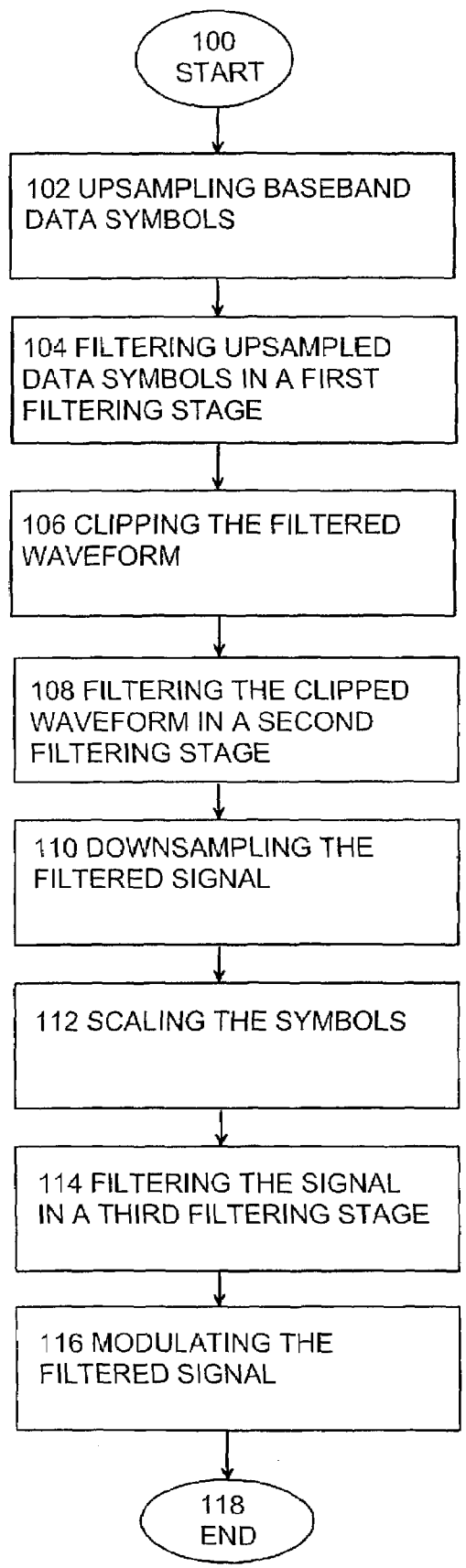
FIG. 1 shows an embodiment of the method according to the invention.

FIG. 1 shows one example of the method according to the invention. All figures show only the I channel because the operations in the Q channel are identical to those in the I channel. In method step 102 the data symbols are up-sampled. In the up-sampling process, zero valued symbols are added to the information stream in order to provide a data stream with a sampling rate higher than the Nyquist rate. If, for example, the original symbols are [1,−1,−1,1] in the I channel, in the up-sampling process zeroes are added in-between the data symbols. The up-sampled data stream can then be for instance [1,0,0,0,−1,0,0,0,−1,0,0,0,1,0,0,0].

In step 104, the up-sampled data symbols are filtered in a first filtering stage. The filtering is performed in a transmit filter, which outputs an information-carrying base-band waveform. In method step 106, the waveform is clipped so that the highest power peaks are eliminated from the filtered wavefrom. In practice, clipping can be done so that the filtered waveform is sampled and such samples that exceed the value of a predetermined threshold value for the power get the threshold value.

In step 108, the clipped waveform is filtered in a second filtering stage and the filtered signal is down-sampled 110. The filtering in this stage is in principle inverse to the filtering in step 104 and consists of a receive filter with the idea to recover the symbol representation of the original data. However, the filtering performed in steps 104 and 108 cause impairment to the symbols that were to be transmitted originally. Because of the up/down sampling processes the symbol values has to be properly scaled in 112.

The impaired symbols are fed to the transmit filter in step 114. The filtered signal is up-converted in step 116 to provide a modulated waveform. In up-conversion, the filtered waveform is modulated with the carrier wave to form a high-frequency radio signal. The radio frequency signal is amplified and fed to one or more transmission antennas for radio transmission.

Figure 2:
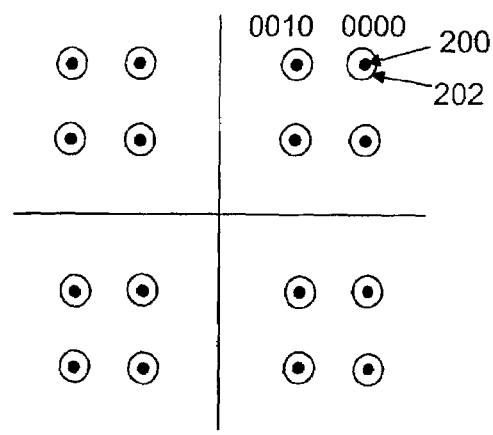
FIG. 2 shows 16-QAM modulation constellation and the effect of the invention on the constellation.

FIG. 2 shows a 16-QAM modulation constellation. The modulation scheme takes 4 bits as input, and so 16 different values in the amplitude-phase coordinate system can be presented. Two constellation points, corresponding to bit combinations 0000 and 0010, are marked in FIG. 2. The traditional 16-QAM modulation uses dot-like constellation values one marked with reference number 200 is shown. In the invention, a small impairment is introduced into modulation points. The dot-like point value 200 does not necessarily apply anymore, but instead the amplitude-phase values are determined from a larger circle 202, however so that the centre point of area 202 is the exact modulation point 200.

Figure 3:
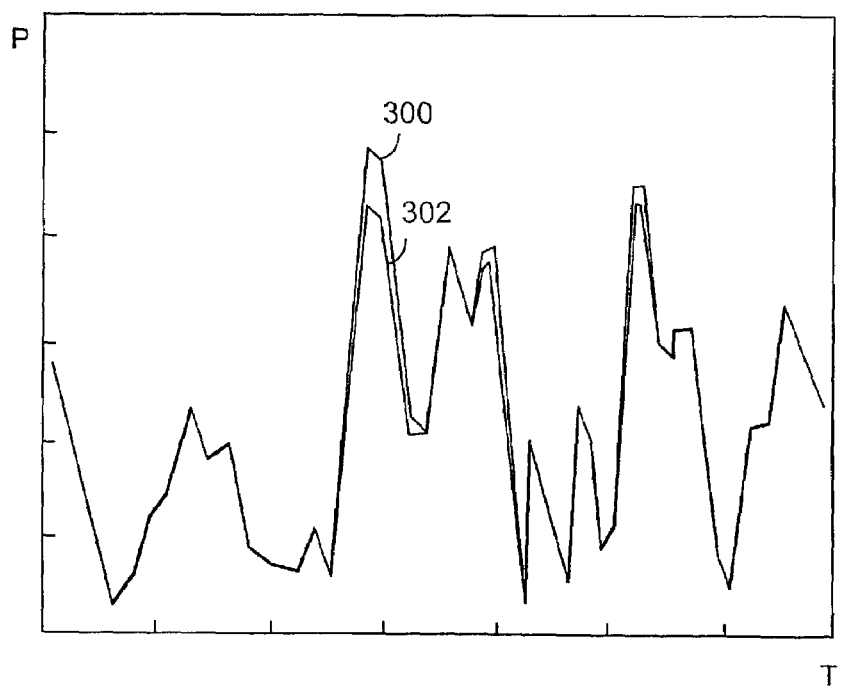
FIG. 3 illustrates the effect of the invention on the waveform.

FIG. 3 illustrates the difference when a traditional 64-QAM modulation and the invention are used. The x axis illustrates time and the y axis shows the power level of the signal. In FIG. 3, signal 300 is an original transmission signal and signal 302 is the signal when the PAPR reduction according to the invention is used.

Figure 4:
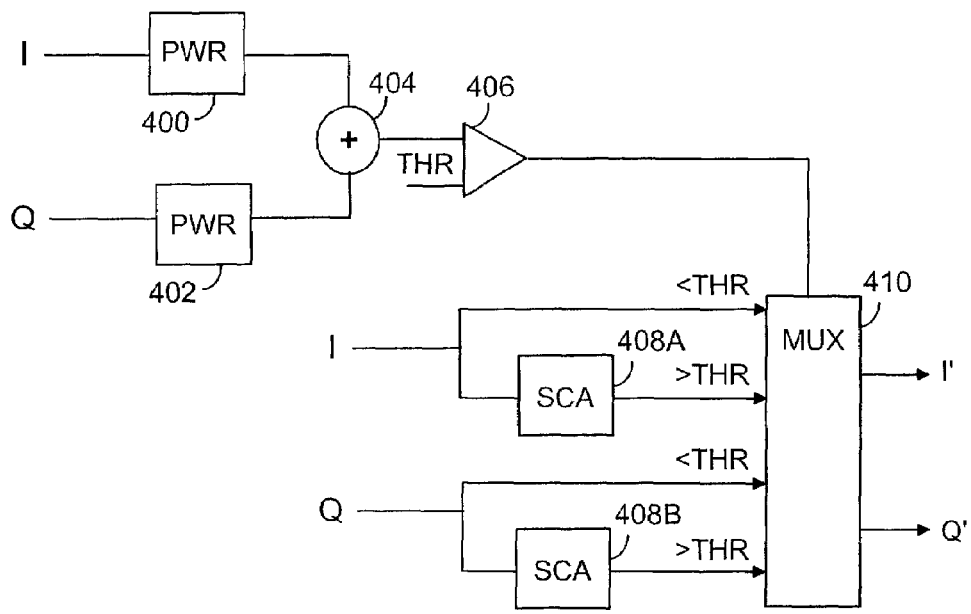
FIG. 4 shows the principle in clipping of the waveform.

FIG. 4 shows the basic principle in clipping of the waveform. The power of I and Q channels is taken in blocks 400 and 402, respectively. The powers are summed in summing means 404. The summed power is compared in comparing means 406 to a predetermined threshold value. The comparison result is transferred to multiplexing means 410. Multiplexer 410 can choose either the non-scaled signal or a scaled signal depending on the comparison result. If the predetermined threshold value is not exceeded, the original I and Q channels are maintained. If the sum exceeds the predetermined threshold value, the I and Q signals are clipped proportionally in scaling means 408A–408B. The scaling can be performed taking a square root of the quotient "threshold/peak". In the following figures, clipping operation shown in FIG. 4 is shown as a single block. Furthermore, in the following figures, all filtering operations are performed separately and identically for I and Q channels.

Figure 5:
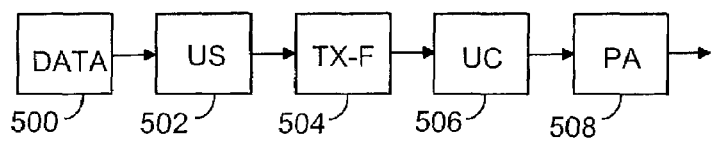
FIG. 5 shows a prior art transmitter structure.

FIG. 5 illustrates one prior art radio transmitter structure showing only parts essential to clarifying the invention. Data 500 contains information bits to be transmitted by the transmitter, such as data or control information. Up-sampling is performed in block 502 and the information bits are modulated by the transmit filter 504. Up-conversion block 506 combines a high-frequency carrier wave and the waveform which carries the user information bits. The modulated radio-frequency signal is amplified by an amplifier 508 before transmission.

Figure 6:
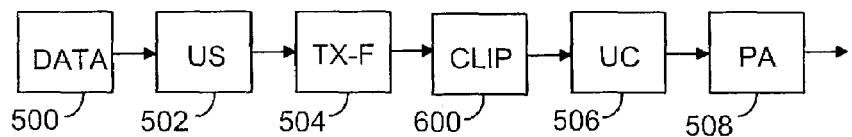
FIG. 6 illustrates another prior art transmitter.

FIG. 6 differs from the transmitter shown in FIG. 5 in that the information-carrying waveform is clipped by clipping block 600 before conversion of the signal to the radio frequency. The solution shown in FIG. 5 suffers from high PAPR, and it cannot be used in practical cases. The clipping shown in FIG. 6 diminishes the requirements for the power amplifier 508 but the clipped signal has a tendency to leak to adjacent channels.

Figure 7:
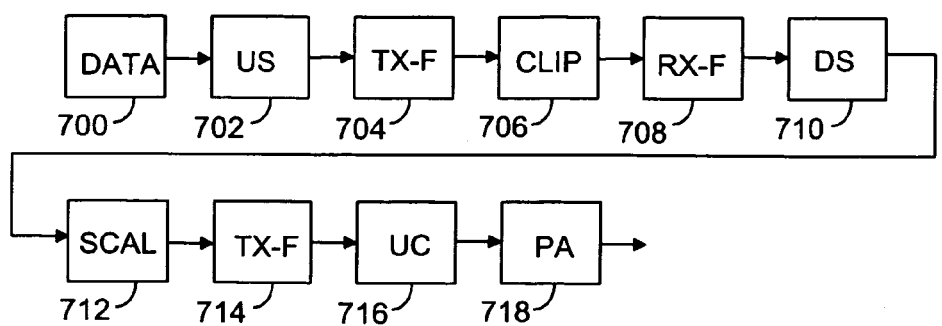
FIG. 7 illustrates one embodiment of a transmitter according to the invention.

FIG. 7 shows one embodiment of the invention. Data 700 is received in a means for up-sampling 702. The up-sampling means 702 forwards up-sampled data to a first means for filtering 704. The filtering means 704 can be implemented for instance as a SRRC filter (square-root-raised-cosine). The SRRC filter can be adapted for instance to 16-QAM modulation, when four information bits are inputted into the filter and a waveform is output to these four bits. 16-QAM is shown here only as an example of the modulation method, and the invention can also be applied to other QAM modulation schemes. After the first filtering step, the created waveform is clipped by a means for clipping 706. After clipping, in the transmitter, the signal is next handled by a second means for filtering 708. This second filtering means 708 can be an inverse filter compared to the first filtering means 704, meaning that they together form a root-raised- cosine filter. The filter, which has low pass characteristics, will average the signal so that the peak will be diminished and spread among the neighbouring symbols. After the second filtering means 708, the signal is down-sampled in a means for down-sampling 710. The purpose in performing the first and second filtering stages around the clipping stage is that impairment is injected into data symbols 700.

The down-sampled symbols are scaled in scaling means 712 due to the up-sampling and fed to a third filtering means 714. The filtered signal is then up-converted to a transmission frequency in up-converting means 716 and amplified in power amplifying means 718 before radio transmission.

Figure 8:
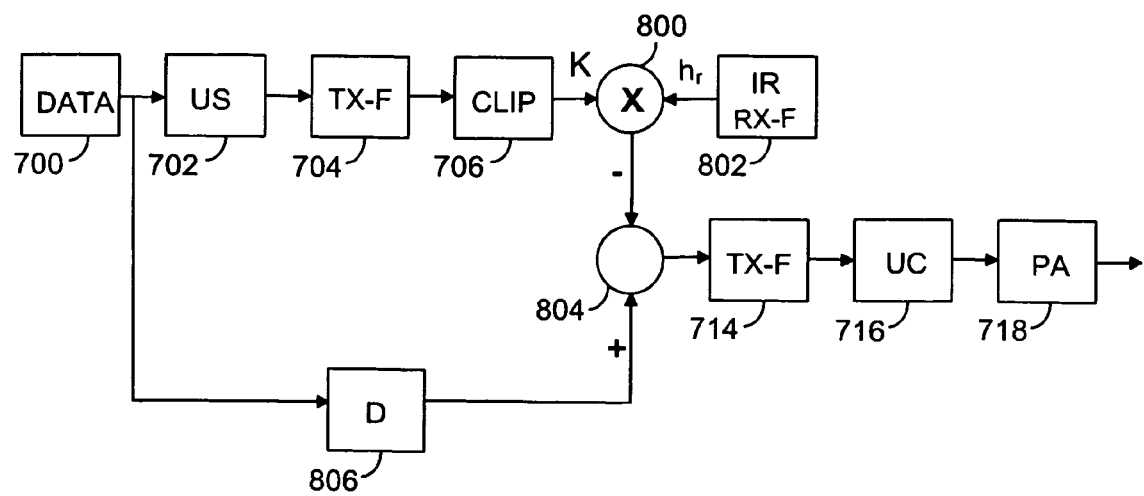
FIG. 8 shows another embodiment of a transmitter according to the invention.

FIG. 8 shows another embodiment of the invention. In a means for multiplying 800, the clipped signal portion K is multiplied with the impulse response of a receive filter. The impulse response to multiplying means 800 is provided by means 802 for providing an impulse response. The original signal is delayed in delaying means 806, and from this delayed original signal, the impaired signal is subtracted in subtracting means 804. The embodiment of FIG. 8 differs from the embodiment of FIG. 7 is that one filter fewer is used.

The following equations illustrate the mathematical background behind the solution shown in FIG. 8. The alternative solution in FIG. 8 is derived from the basic solution in FIG. 7 for the case when one peak of the transmit filter exceeds the threshold value. In the following, s[n] denotes symbols obtained from block 700, x[n] denotes the signal from the clipping means 706, and y[n] is the signal where the effect of the receiving signal has been taken into consideration.

Equation (1) shows thus the clipped signal $$x[n] = \left(\sum_i s[i]h_t[n-i]\right) - K\delta(n-m), \text{ where} \tag{1}$$

K is the clipped part of the signal, $h_t$ is the impulse response of the transmitting filter and m is the time instant for the clipping. The index i runs through all taps of the transmit filter. The δ is the unit sample sequence and denotes an impulse at time m. In the transmitting filter, convolution is calculated between the data symbols and the impulse response of the transmitting filter.

The signal after the receive filter 708 is shown by equation (2), $$y[n] = \sum_j \left(\left(\sum_i s[i]h_t[j-i]\right) - K\delta(n-m)\right)h_r[n-j], \text{ where} \tag{2}$$

$h_r$ is the impulse response of the receive filter and the index j runs through all taps of the filter. K is the amount of clipping that was carried out at time m. By interchanging the order of indices equation (2) can be rewritten (3).

$$y[n] = \left(\sum_i s[i]\sum_j (h_t[j-i]h_r[n-j])\right) - Kh_r[n-m] \tag{3}$$

If the transmit and receive filters with impulse responses $h_t[n]$ and $h_r[n]$ form a raised cosine filter according to equation (4), $$rc = h_t * h_r, \text{ then} \tag{4}$$

equation (3) can be rewritten in form of equation (5)

$$y[n] = \left(\sum_i s[i]rc[n-i]\right) - Kh_r[n-m]. \tag{5}$$

Because the convolution of s[ ] and rc[ ] is a delayed version of s[ ] after downsampling, equation (6) is obtained $$y[n] = s[n+D] - Kh_r[n-m]. \tag{6}$$

Thus, the signal y[n] that is input to a transmitting filter 714 is a signal from which the clipped signal portion multiplied by the impulse response of the receive filter is subtracted. Thus, the resulting signal y[n] is the delayed original signal subtracted by the impulse response of the receive filter weighted with the amount of clipping performed at time m. In order to modify the impairment produced by the clipping, the signal can also be formed by subtracting the impulse response of some other optimally selected filter instead of the receive filter.

The invention can be realized by using filters or by modifying the signals with impulse responses of the filters. Besides the filters, software, ASIC or separate logic components can be used for implementation of features in the invention.

Even though the invention is described above with reference to an example according to the accompanying drawings, it is clear that the invention is not restricted thereto but it can be modified in several ways within the scope of the appended claims.

The invention claimed is:

1. A method, comprising:
   filtering data symbols to be transmitted with a first transmit filter to form a waveform the method being a data transmission method used in conjunction with Quadrature Amplitude Modulation in a radio system;
   comparing the waveform to a predetermined threshold value of power level;
   clipping power peaks that exceed the predetermined threshold value from the waveform to form a clipped waveform;
   filtering the clipped waveform with a receive filter to form an impaired signal such that the error caused by clipping is spread out on a few symbols around the peak of the waveform;
   filtering the impaired signal with a second transmit filter to form a modulated signal;
   up-converting the modulated signal to a transmission frequency; wherein the first transmit filter and the receive filter together form a raised cosine filter.

2. A method, comprising:
   filtering data symbols to be transmitted with a first transmit filter to form a waveform the method being a data transmission method used in conjunction with Quadrature Amplitude Modulation in a radio system;
   comparing the waveform to a predetermined threshold value of power level;
   clipping power peaks that exceed the predetermined threshold value from the waveform;
   multiplying the clipped power peaks with an impulse response of a receive filter to form an impaired signal;
   subtracting the impaired signal from the data symbols to be transmitted to form subtracted data symbols;
   filtering the subtracted data symbols with a second transmit filter to form a modulated signal;
   up-converting the modulated signal to a transmission frequency; wherein the first transmit filter and the receive filter together form a raised cosine filter.

3. The method of claim 1, further comprising selecting the predetermined threshold value so that the peak-to-average power ratio is reduced in the signal filtered by the first transmit filter.

4. A radio transmitter, comprising:
   a first transmit filter for filtering data symbols to be transmitted to form a waveform, the radio transmitter uses Quadrature Amplitude Modulation;

a comparing unit configured to compare the waveform to a predetermined threshold value;

a clipping unit configured to clip power peaks that exceed the predetermined threshold value from the waveform to form a clipped waveform;

a receive filter for filtering the clipped waveform to form an impaired signal such that the error caused by clipping is spread out on a few symbols around the peak of the waveform;

a second transmit filter for filtering the impaired signal to form a modulated signal;

an up-converting unit configured to up-convert the modulated signal to a transmission frequency, wherein the first transmit filter and the receive filter together form a raised cosine filter.

5. A radio transmitter, comprising:

a first transmit filter for filtering data symbols to be transmitted to form a waveform, the radio transmitter uses Quadrature Amplitude Modulation;

a comparing unit configured to compare the waveform to a predetermined threshold value;

a clipping unit configured to clip power peaks that exceed the predetermined threshold value from the waveform to form a clipped waveform;

a multiplying unit configured to multiply the clipped power peaks with an impulse response of a receive filter to form an impaired signal;

a subtracting unit configured to subtract the impaired signal from the data symbols to be transmitted to form subtracted data symbols;

a second transmit filter for filtering the subtracted data symbols to form a modulated signal;

a up-converting unit configured to up-convert the modulated signal to a transmission frequency, wherein the first transmit filter and the receive filter together form a raised cosine filter.

6. The transmitter of claim 4, wherein the clipping unit is configured to select the predetermined threshold value so that the peak-to-average power ratio is reduced in the signal filtered by the first transmit filter.

7. An apparatus, comprising:

a first transmit filter for filtering data symbols to be transmitted to form a waveform, the apparatus uses Quadrature Amplitude Modulation;

means for comparing the waveform to a predetermined threshold value;

means for clipping power peaks that exceed the predetermined threshold value from the waveform to form a clipped waveform;

a receive filter for filtering the clipped waveform to form an impaired signal such that the error caused by clipping is spread out on a few symbols around the peak of the waveform;

a second transmit filter for filtering the impaired signal to form a modulated signal;

means for up-converting the modulated signal to a transmission frequency; wherein the first transmit filter and the receive filter together form a raised cosine filter.

8. An apparatus, comprising:

a first transmit filter for filtering data symbols to be transmitted to form a waveform, the apparatus uses Quadrature Amplitude Modulation;

means for comparing the waveform to a predetermined threshold value;

means for clipping power peaks that exceed the predetermined threshold value from the waveform to form a clipped waveform;

means for multiplying the clipped power peaks with an impulse response of a receive filter to form an impaired signal;

means for subtracting the impaired signal from the data symbols to be transmitted to form subtracted data symbols;

a second transmit filter for filtering the subtracted data symbols to form a modulated signal;

means for up-converting the modulated signal to a transmission frequency; wherein the first transmit filter and the receive filter together form a raised cosine filter.

* * * * *